United States Patent [19]

Zell et al.

[11] Patent Number: 5,020,874
[45] Date of Patent: Jun. 4, 1991

[54] METHOD OF AND DEVICE FOR FEEDING A PLURALITY OF OPTICAL WAVEGUIDES INTO A CLAMPING DEVICE

[75] Inventors: Werner V. Zell, Köln; Johann A. Becker, Overath; Detlef M. Boehm, Neunkirchen-S.; August G. Fröhlich, Köln; Detlef Schade, Köln; Bernhard R. Goletz, Köln, all of Fed. Rep. of Germany

[73] Assignee: U.S. Philips Corp., New York, N.Y.

[21] Appl. No.: 347,592

[22] Filed: May 4, 1989

[30] Foreign Application Priority Data

May 6, 1988 [DE] Fed. Rep. of Germany ....... 3815459

[51] Int. Cl.⁵ .......................... G02B 6/36; G02B 7/26
[52] U.S. Cl. ............................... 350/96.20; 350/96.22
[58] Field of Search ........................... 350/96.20, 96.22

[56] References Cited

U.S. PATENT DOCUMENTS 4,717,233 1/1988 Szkaradnik ................. 350/96.20

FOREIGN PATENT DOCUMENTS 211211 2/1987 European Pat. Off.

Primary Examiner—John D. Lee
Assistant Examiner—Robert E. Wise
Attorney, Agent, or Firm—Ernestine C. Bartlett

[57] ABSTRACT

The invention relates to a method of feeding a plurality of optical waveguides into a clamping device, between whose clamping jaws the optical waveguides are clamped in a side-by-side relationship in one plane. A simple and easily operatable method, which in subsequent production stages ensures the preservation of the relative position of the individual optical waveguides, is obtained in that the clamping device is placed such by means of form-locking elements in a fixed position at a housing member between two sorting forks of the sorting device that feed-in channels of the sorting forks are in alignment with a take-up channel of the clamping device, in that thereafter the optical waveguides are placed in the sorting forks and in the take-up channel which has previously been widened by loosening its clamping jaws, in that the optical waveguides are then pressed together by means of a slide-film material which is inserted into the threading channels and/or the take-up channel, in that the clamping action of the clamping jaws causes the optical waveguides to be clamped and finally the clamping device together with the optical waveguides contained therein is removed from the sorting device.

16 Claims, 2 Drawing Sheets

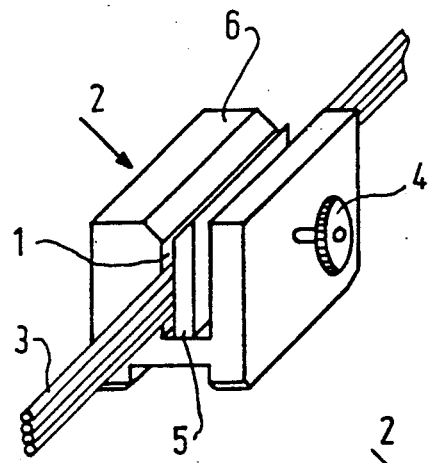
Fig. 1
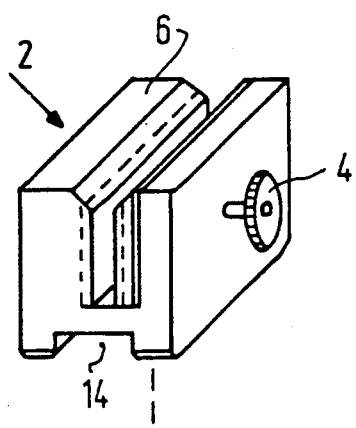
Fig. 2
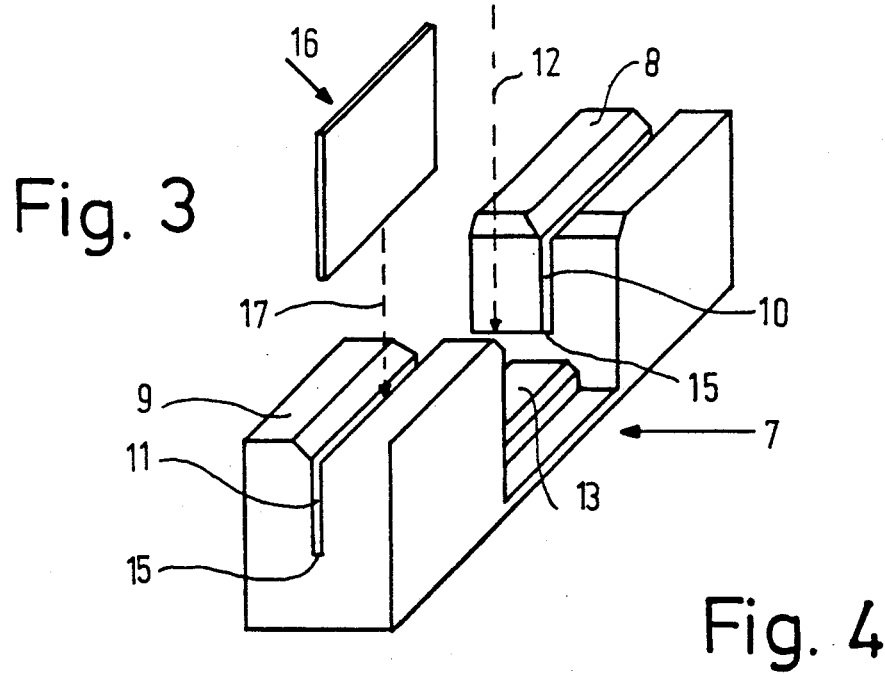
Fig. 3
Fig. 4

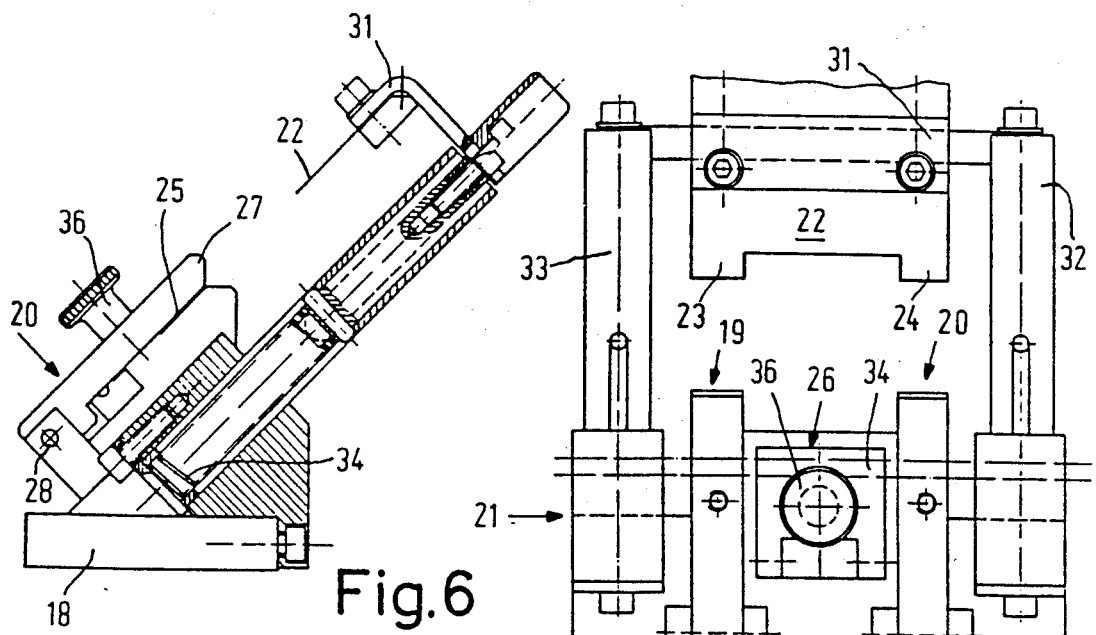
Fig.6
Fig.5
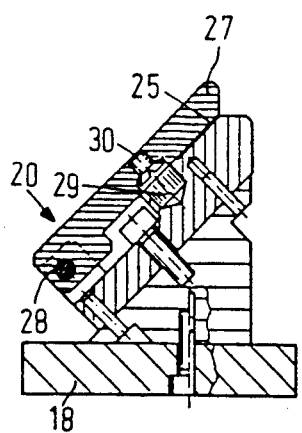
Fig.7
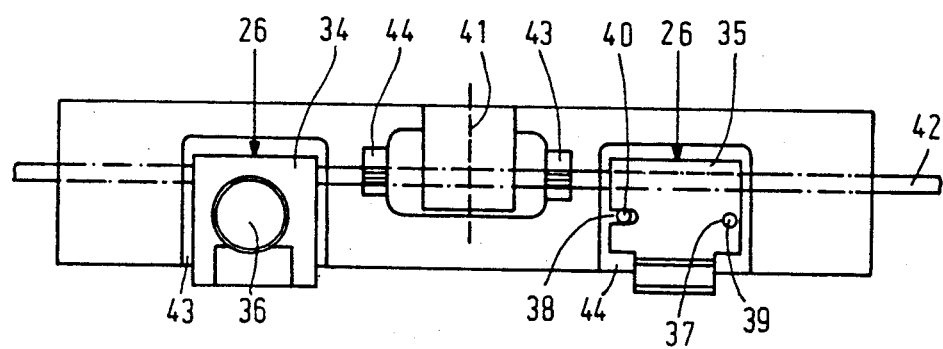
Fig. 8

METHOD OF AND DEVICE FOR FEEDING A PLURALITY OF OPTICAL WAVEGUIDES INTO A CLAMPING DEVICE

FIELD OF THE INVENTION

The invention relates to a method of feeding a plurality of optical waveguides into a clamping device having clamping jaws between which clamping jaws the optical waveguides are clamped in one plane.

BACKGROUND OF THE INVENTION

EP-A-0211221 discloses clamping devices for the fixed positioning of a plurality of parallel arranged optical waveguides, in which the optical waveguides are placed in a first position on a multiple tool. The clamping devices can be shifted along the multiple tool in the longitudinal and the transverse directions. They are moved in a second range for the preparation of their end faces and in a third range for the production of a welded joint. Said European Application does not disclose how the optical waveguides are threaded into the clamping devices.

SUMMARY OF THE INVENTION

The invention has for its object the provision of a simple easy-to-perform method optical waveguides into a clamping device having clamping jaws between which clamping jaws the optical waveguides are clamped in one plane, which method renders it possible to preserve the relative positions of the individual optical waveguides even in cases in which operating steps must be performed on the optical waveguide in different, separate tools.

This object is accomplished in that the clamping device, comprising a take-up channel is applied by means of form-locking elements comprising threading channels; in a fixed position at a housing member between two sorting forks of a sorting device, the sorting forks comprising; feed-in channels that are in alignment with the take-up channel of the clamping device, after which the optical waveguides are placed in the sorting forks and in the take-up channel (which has previously been widened by loosening its clamping jaws), the optical waveguides then being pressed together by means of slide-film material which is inserted into the threading channels and/or the take-up channel, so that the clamping action of the clamping jaws causes the optical waveguides to be clamped; and finally the clamping device is taken from the sorting device together with the optical waveguides inserted therein.

According to the invention, the auxiliary means for threading the optical waveguides are not part of the clamping device, which consequently can be of a very compact structure and of small size. Inserting the optical waveguides in the clamping device is done outside the actual working tools, which are used for preparing and/or connecting optical waveguide groups. After the optical waveguides have been accurately and immovably placed in contact with each other by means of the clamping device, the latter is removed together with the optical waveguides contained therein from the sorting device and can thereafter be placed in a defined position in each of the required subsequent devices.

Since sorting forks are provided on both sides of the clamping device, the optical waveguides are in an accurately parallel position in the overall length of the take-up channel of the clamping device.

Preferably, the sliding film material presses the optical waveguides against stop bottom areas of the threading channels and/or the take-up channel. As a result, the individual optical waveguides are immediately placed in a defined relative position relative to the sorting device.

A sorting device by means of which the method of the invention can be advantageously performed, has a basic member having two spaced-apart, facing sorting forks comprising threading channels that are in alignment, and between the sorting forks a clamping device can be fixed by means of form-locking elements having a take-up channel which is aligned with the threading channels. The clamping device can be placed via form-locking elements in a simple and detachable manner in the sorting device and be removed therefrom again. Preferably, it is provided that the form-locking elements of the sorting device engage form-locking elements of the clamping device which are provided for the purpose of fixing the clamping device on devices for manufacturing and/or preparing a coupling to the optical waveguide. Under these circumstances, the clamping device is connectable by means of single form-locking elements to similarly arranged form-locking elements of the sorting device and subsequent tools.

In accordance with a preferred embodiment, it is provided that the form-locking elements are constituted by pins arranged on the sorting device, one of these pins engaging a bore assigned to the clamping device and the other pin engaging a slotted hole of the clamping device which extends in the direction of the connecting lines of the pins. Form-locking elements of this type can be produced in a simple manner and enable an accurate positional securing of the clamping device.

Removing the clamping device holding a group of optical waveguides from the sorting device is simplified by the fact that one of the side walls forming the feed-in channels is hingeable.

Inserting and pressing the optical waveguides into the threading channels of the sorting fork and/or in the take-up channel of the clamping device is made easier in that the slide film material is provided in a slide holder of the sorting device, which is slidable against the action of a spring in longitudinal bearings of the sorting device.

BRIEF DESCRIPTION OF THE DRAWINGS

The invention will now described in greater detail with reference to advantageous clamping devices and sorting devices shown in the accompanying drawing.

FIG. 1 shows a first embodiment of a clamping device clamping optical waveguides.

FIG. 2 shows the clamping device of FIG. 1 before it is placed into a sorting device.

FIG. 3 shows a slide film material.

FIG. 4 shows a sorting device.

FIG. 5 is a front view of a second embodiment of a sorting device according to the invention with a second embodiment of a clamping device positioned therein.

FIG. 6 is a partly cross-sectional side view of the arrangement of FIG. 5.

FIG. 7 is a cross-sectional view through the arrangement of FIG. 5 in the region of a sorting fork.

FIG. 8 is a view of a schematically shown welding device in which clamping devices of the type shown in FIG. 5 are positioned.

DETAILED DESCRIPTION OF THE PREFERRED EMBODIMENTS

In the take-up channel of the clamping device 2, which is shown in a perspective view in FIG. 1, four optical waveguides 3 are clamped in a parallel side-by-side arrangement. By means of adjusting screw 4, the clamping jaw 5 is pressed against the optical waveguides 3, which as a result are immovably fixed between the slightly resiliently coated walls of the clamping jaw 5 and its counterpart 6 of the clamping device 2 by means of elastic clamping force.

The method of feeding the optical waveguides 3 into the take-up channel 1 will now be described with reference to the FIGS. 2 to 4.

The sorting device 7 has two sorting forks 8 and 9 which are provided with threading channels 10 and 11, respectively, which are in alignment with each other. The clamping device 2 which is inserted in the direction indicated by the arrow 12 fits in the free space between the sorting forks. The stud 13 is of such a form that it fits into the nut 14 of the clamping device 2 which is thereby prevented from shifting in the lateral direction. The walls of the counterpart 6 of the clamping device 2 are then in alignment with the corresponding planes of the threading channels 10 and 11. Then the optical waveguides 3 are continuously fed into the threading channels 10 and 11 and pressed against the flat bottom portion in the direction of the arrow 12 by means of the slide-film material 16. Thereafter the optical waveguides extend in parallel and contact each other in a side-by-side relationship in the area of the opened take-up channel 1 of the clamping device 2. After the optical waveguides 3 have been fixed by turning the adjusting screw 4, the clamping device 2 together with the optical waveguides 3 contained therein are removed from the sorting device 7 in a direction opposite to that of the arrow 12.

The small width of the threading channels 10 and 11 is slightly larger than the diameter of the optical waveguides 3. The threading channels can however be of a cross-section which is narrowed in such a manner as to be slightly resilient, which provides a weak clamping of the optical waveguides 3.

The slide film material is of a thickness which is slightly less than the width of the threading channels.

FIGS. 5 to 7 show a further embodiment of a sorting device according to the invention, which is designed as a compact tool which is easy to handle and consequently is particularly suitable for frequently repeated operating procedures.

In addition to the sorting forks 19 and 20 a linear guide device 32, 33 for operating the slide-film material 22 which is to move the optical waveguides with their projecting cross-sections 23 and 24 only in the region of the threading channels 25 (FIG. 6) of the sorting forks 19 and 20 is fixed onto a common basic block 18.

To facilitate the subsequent removal of the optical waveguides clamped by the clamping device 26, a wall portion 27 can be pivoted around the hinge pin 28 against the holding force exercised by the armature of a permanent magnet 29 (FIG. 7) which is constituted by the screw 30.

The slide-film material 22 is fitted to a holder 31, which by means of the linear guide means 32 and 33 can be guided in a direction towards the sorting forks 19 and 20 against the opposing force of the spring 34, so that the slide-film material is fed into the threading channels 25 of the sorting forks 19 and 20 and is pressed onto the previously inserted optical waveguides.

In the sorting device 21 shown in FIGS. 5 to 7 the clamping device 26 is formed by two pivotally interconnected clamping jaws 34 and 35, which for the purpose of clamping the inserted optical waveguides are movable in opposite directions by means of the setting screw 36.

The clamping jaw 26 which bears against the sorting device 21 is shown in FIG. 8. As form-locking elements the clamping jaw has a bore 37 and a slotted hole 38, in which relevant pins (not shown) of the sorting device 21 penetrate. FIG. 8 shows similar pins 39 and 40 as take-up form-locking elements of a schematically shown welding device, by means of which similar groups of optical waveguides guided along the track 42 and held by two clamping devices 26 must be welded together in the position indicated by the broken line 41.

The fine alignment of the optical waveguides which project from the clamping devices 26 and from which in that region the coating has been removed is effected by conventional sorting elements 43 and 44, respectively, which are in the shape of a comb. The axial alignment and facing position of the two groups of optical waveguides is ensured by the form-locked fixation by the clamping devices 26 in recessed portions 43 and 44, respectively, of the welding device.

As the flexible slide-film material 22 only presses onto the optical waveguides in the region of the sorting forks 19 and 20 and does not penetrate into the take-up channel of the clamping device 26, the film material cannot be clamped together with the optical waveguides.

The method according to the invention and the appropriate sorting devices are suitable for the planary arrangement of a loose group of individual optical waveguides. However, they are also suitable for fixing groups of optical waveguide ribbons which were previously already cemented together in one plane in a defined position in a clamping device.

We claim:

1. A method of feeding a plurality of optical waveguides into a clamping device having clamping jaws, the optical waveguides being clamped between said clamping jaws in one plane.

wherein (a) the clamping device is applied by means of form-locking elements in a fixed position at a housing member between two sorting forks of a sorting device having threading channels so that feed-in channels of the sorting forks are in alignment with a take-up channel; (b) the optical waveguides are placed in the sorting forks and in the take-up channel which has previously been widened by loosening the clamping jaws of the clamping device; (c) the optical waveguides are then pressed together by means of insertion of a slide-film material which is inserted into the threading channels and/or the take-up channel so that the clamping action of the clamping jaws causes the optical waveguides to be clamped; and the clamping device is taken from the sorting device together with the optical waveguides inserted therein.

2. A method as claimed in claim 1, wherein the optical waveguides are pressed by the slide film material onto stop bottom surfaces selected from the group consisting of the threading channels, the take-up channels and combinations thereof.

3. A sorting device for performing the method as claimed in claim 1 or 2, which includes a basic member (18) with two spaced apart facing sorting forks (8, 9, 19, 20) having threading channels (10, 11, 25) that are in alignment with each other, a clamping device being fixed between the sorting forks (8, 9, 19, 20) by means of form-locking elements (13, 14, 37, 38, 39, 40) said clamping device having adjustable clamping jaws (5, 6, 34, 35) in a take-up channel (1) which is in alignment with the threading channels.

4. A device as claimed in claim 3, wherein the form-locking elements (13) of the sorting device (7, 21) engage form-locking elements (14, 37, 38) of the clamping device (2, 26), which are provided for the purpose of positioning the clamping device on arrangements for the manufacture of a splice of the waveguides (3).

5. A device as claimed in claim 4 wherein one of the side walls (27) constituting the threading channels (25) can be pivoted outwardly.

6. A device as claimed in claim 4 wherein the slide-film material (22) is provided on a slide holder (31) of the sorting device (21), which is slidable against the action of a spring (34) along longitudinal bearings (32, 33) of the sorting device.

7. A device as claimed in claim 4, wherein the form-locking elements are constituted by pins provided on the sorting device (21) one pin projecting into an associated bore (37) of the clamping device (26) and the other pin projecting into a slotted hole (38) of the clamping device (26), which extends in a direction towards the connecting lines of the pins.

8. A device as claimed in claim 7 wherein one of the side walls (27) constituting the threading channels (25) can be pivoted outwardly.

9. A device as claimed in claim 7 wherein the slide-film material (22) is provided on a slide holder (31) of the sorting device (21), which is slidable against the action of a spring (34) along longitudinal bearings (32, 33) of the sorting device.

10. A device as claimed in claim 3, wherein the side walls (27) constituting the threading channels (25) can be pivoted outwardly.

11. A device as claimed in claim 10 wherein the slide-film material (22) is provided on a slide holder (31) of the sorting device (21), which is slidable against the action of a spring (34) along longitudinal bearings (32, 33) of the sorting device.

12. A device as claimed in claim 3, wherein the slide-film material (22) is provided on a slide holder (31) of the sorting device (21), which is slidable against the action of a spring (34) along longitudinal bearings (32, 33) of the sorting device.

13. A device as claimed in claim 3 wherein the form-locking elements are constituted by pins provided on the sorting device (21), one pin projecting into an associated bore (37) of the clamping device (26) and the other pin projecting into a slotted hole (38) of the clamping device (26), which extends in a direction towards the connecting lines of the pins.

14. A method as claimed in claim 1 wherein the slide-film material is inserted into the threading channels of the sorting device.

15. A method as claimed in claim 1 wherein the slide-film material is inserted into the take-up channel of the clamping device.

16. A method as claimed in claim 1 wherein the slide-film material is inserted into the threading channels of the sorting device and the take-up channel of the clamping device.

* * * * *